3,355,665
MOISTURE MEASURING PROBE HAVING AN INSULATING MATERIAL COVERING LESS THAN ONE-HALF OF THE PERIMETER OF THE PROBE
Lloyd V. Fegan, Jr., Lebanon, Pa., assignor, by mesne assignments, to Bethlehem Steel Corporation, a corporation of Delaware
Continuation of application Ser. No. 249,814, Jan. 7, 1963. This application Jan. 3, 1967, Ser. No. 607,075
5 Claims. (Cl. 324—65)

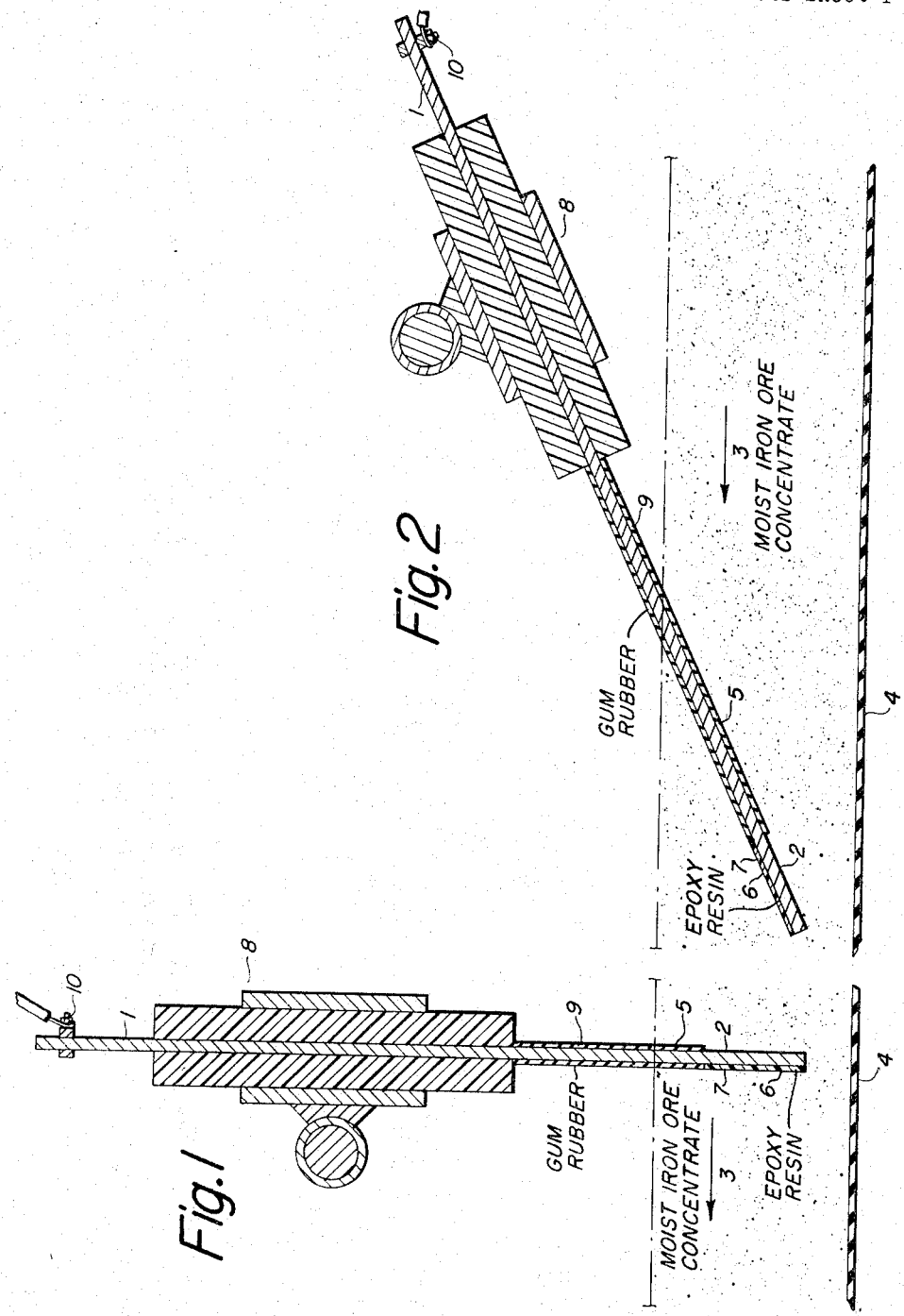

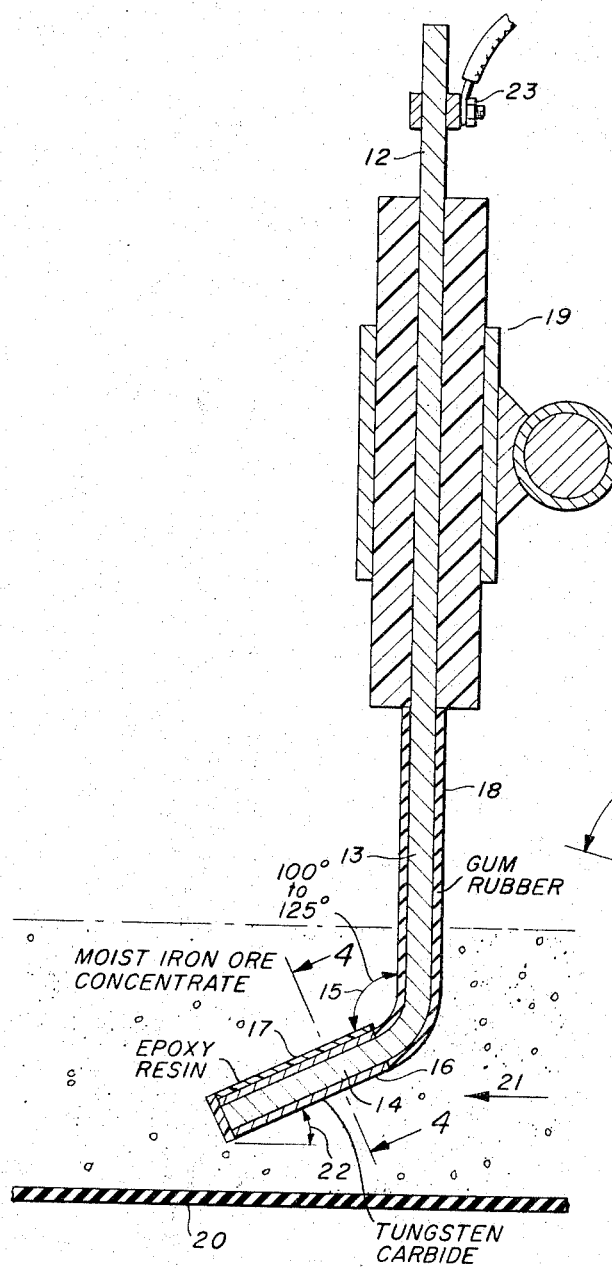
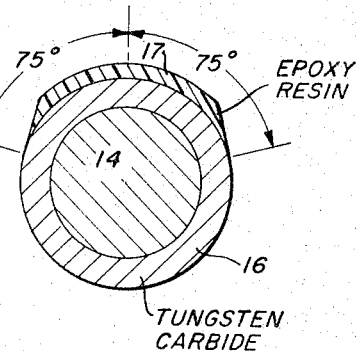

This application is a continuation of application Ser. No. 249,814, filed Jan. 7, 1963, and now abandoned.

This invention relates in general to a probe intended to be used in conjunction with an electrical instrumentation system to record and/or automatically control the moisture content of conveyed bulk materials and in particular to record and/or automatically control the moisture content of iron ore concentrates.

Because of the depletion of high grade ores in this country, the iron ore mining industry has turned its attention to the beneficiation of the plentiful low grade ores. Through beneficiation of these ores, the industry is able to provide a high grade, uniform raw material for use in the manufacture of steel. The industry has learned that to produce an agglomerate of this high grade material, which can be used economically and efficiently, it is necessary to produce a pellet which must have sufficient strength to resist crumbling, be sufficiently hard to resist flattening and be sufficiently tough to resist fracturing. These characteristics are directly related to the moisture content of the low grade iron ore concentrates. It is essential, therefore, to accurately control the moisture content of these concentrates in order to produce a satisfactory usable pellet.

It is well known that the moisture content of bulk materials such as iron ore concentrates, foundry sand, coal, etc. can be determined through the measurement of the electrical conductivity of these substances. The conductivity of these substances varies with the moisture content, that is, the higher the moisture content of these materials the greater is their capacity to conduct an electrical current.

Many moisture measuring devices are being used in industry today, for example, sinter plants, foundry sand preparation, and coal drying. They are of limited sensitivity and are inaccurate because they cannot filter out unwanted resistance changes and are subject to probe errors caused by wear and material build-up. Most of the probes operate on the principle that the electrical resistance of moist materials is proportional to the amount of moisture they contain, that is, the higher the moisture content the greater the electrical conductivity of the material between the electrodes or probes. The probes, usually paired, used in these systems are made of an electrically conducting material such as bronze, brass, or stainless steel. The probes are usually inserted vertically into the moving material being tested. If the material to be tested is abrasive in nature, the probes are abraded readily, causing a continual change in the cross-sectional area of the body of the probe, resulting in a change in the resistance to the flow of electrical current necessitating a constant balancing of the bridge circuits to which they are connected. The probes are also subjected, with certain materials, to material build-up on both their leading surface and their trailing surface, again resulting in a change in the resistance to the flow of electric current and requiring a constant balancing of the bridge circuits.

Iron ore concentrates in particular are highly conductive, highly abrasive and, when wet, highly adherent materials. The moisture metering system employed to regulate the moisture content of the said concentrates must be sensitive to minute fluctuations in the electrical resistance of the said concentrates. The electrode or probe to be used must be highly resistant to abrasion and must conduct an electric current.

It is therefore the primary object of this invention to provide a probe, for use in a device to measure the electrical conductivity of a moving bed of moist granular material, which will have a constant area exposed to the moist material and which will be substantially free of any material build-up on the leading surface.

It is another object of this invention to provide a probe for use in a device to measure the electrical conductivity of a moving body of moist granular material, said probe having a tip inserted in the moving bed, said tip having an uninsulated electrically conducting substantially constant area on its leading surface exposed to the moist material and an insulated non-electrically conducting area not subject to electrical variations induced by material build-up on its trailing surface.

It is another object of this invention to provide a probe for use in a device to measure the electrical conductivity of a moving bed of moist iron ore concentrate, said probe having an end portion inserted in the moving bed, said end portion being protected by an abrasion resistant electrically conductive sleeve, said sleeve having an electrically conductive area exposed to the moist concentrate on its leading surface, said area remaining substantially constant, and an electrically insulated area on the trailing surface which is unaffected by any material build-up.

It is another object of this invention to provide a probe for use in a device to measure the electrical conductivity of a moving bed of moist iron ore concentrate, which is designed so that it will be substantially free of any material build-up on its leading edge when inserted into the moving iron ore concentrate.

It is another object of this invention to provide a pair of spaced probes for use in a device to measure the electrical conductivity of a moving bed of iron ore concentrate which may be inserted into the bed of iron ore concentrates to accurately measure the moisture content thereof, said moisture content being proportional to the amount of electrical current flowing through the moist concentrate between the said spaced probes.

Other objects and features of the invention will become apparent as the description proceeds, especially when taken in conjunction with the accompanying drawings.

The present invention comprises a probe adapted to be inserted downwardly into a moving bed of moist granular material, said probe having a metallic electrode with an end portion which has an electrically conductive substantially constant area of its leading or upstream surface exposed to the moist bed of material. The trailing or downstream surface of the end portion is coated with an electrically insulating coating which will prevent any fluctuations in the passage of the electric current due to material build-up on this surface.

Several embodiments of the invention are illustrated in the drawings wherein:

FIGS. 1 and 2 are longitudinal sectional views of one form of a probe constructed in accordance with the present invention.

FIG. 3 is a longitudinal sectional view of a probe to be used in moist iron ore concentrates and is the preferred embodiment of the invention.

FIG. 4 is a cross sectional view of the probe taken through section 4—4 of FIG. 3.

Referring to FIG. 1, the probe includes a metallic electrode 1 having an end portion 2 inserted vertically downwardly into a bed of moist bulk material 3 being conveyed on belt 4 in the direction shown. The upstream surface 5 comprises an area exposed to the moist material which remains substantially constant. The downstream surface 6 is coated with an electrically insulating material 7. The remaining portion of the electrode 1 between the end portion 2 and the supporting member 8 is encased in a sleeve 9, said sleeve being of an electrically insulating material, for example, pure gum rubber. The straight portion of the metallic electrode 1 is connected to an automatic electrically actuated moisture metering system (not shown) by means of bolt 10.

FIG. 2 shows a structure similar to FIG. 1 but the end portion of the probe is inserted at an angle. The said end portion extends in the direction of the flow of the moving moist granular material. I have found that by inserting the end portion at an angle of at least 10° and not more than 35° with the moving bed of moist granular material, the upstream surface of the end portion is kept free of material build-up and foreign matter thus keeping a substantially constant area exposed to the moist material and the downstream surface is coated with an electrically insulating material and is substantially free from fluctuations in electric current due to material build-up on this surface.

Referring now to FIG. 3 which is the preferred embodiment of my invention, the probe includes a metallic electrode 12 having a straight portion 13 and an angularly disposed end portion 14, said angularly disposed end portion 14 forming an angle 15 of at least 100° and not more than 125° with the straight portion 13 of the said metallic electrode 12. The angularly disposed end portion 14 of the metallic electrode 12 is encased in an electrically conducting abrasion resistant sleeve 16 made of a material such as tungsten carbide. Encasing the angularly disposed end portion of the probe in the said sleeve 16 will minimize the effect the inherent abrasiveness of the iron ore concentrate will have upon the said end portion 14 of the probe. At the same time, the abrasiveness of the moist concentrate will prevent any material build-up on the leading surface of the probe and will remove any foreign material from the said surface thus keeping the upstream surface of the sleeve exposed to the moist iron ore substantially constant.

I coat the trailing or downstream surface of the said sleeve 16 with an electrically insulating material 17 such as an epoxy resin. In moving past the probes, the iron ore concentrate is forced to flow around the probe, but will tend to come together again in the downstream side of the probe. Since the concentrate is "sticky" it will have a tendency to agglomerate in the protected downstream side of the probe. The material build-up on this surface of the sleeve will not affect passage of electrical current because of the insulating coating on the downstream surface of the probe. I have found that it is desirable to coat the downstream surface in such a manner that, as shown on cross-sectional view, FIG. 4, the surface covered constitutes 75° on either side of a radius of a circle. The lower end of the straight portion of the metallic electrode is encased in an electrically insulating abrasion resistant sleeve of pure gum rubber 18. The straight portion 13 of the metallic electrode 12 is connected to an automatic electrically actuated moisture metering system (not shown) by means of the bolt 23.

In practice, I support the metallic electrode 12 by the apparatus 19 fastened to any convenient holder so that the extreme end of the said angularly disposed end portion 14 is positioned approximately ½″ above the conveyor belt 20 which is moving a 3 inch deep body of moist iron ore concentrate 21 to which a bentonite binder has been added, in the direction indicated. As the ore body 21 passes the angularly disposed end portion 14 of the probe, the tungsten carbide sleeve 16 is kept clean by the inherent abrasiveness of the concentrate. I have found that if the electrode is bent so that the angularly disposed end portion 14 makes an angle 22 of at least 10° but not more than 35° with the horizontal or moving bed 21, the leading surface of the probe remains clean and the area exposed to the moist concentrate remains substantially constant, resulting in a uniform electrical contact between the probe and the concentrate and thus resulting in a trouble-free constant recording and regulating moisture metering system. I prefer to bend the metallic electrode in such a manner that the angularly disposed end portion makes an included angle 15 of at least 112° but not more than 118° with the straight portion of the metallic electrode, resulting in the said angularly disposed end portion being at an angle 22 of at least 22° and not more than 28° with the horizontal.

Referring again to FIGS. 1 and 2, the probes as shown can be used with materials, for example, coal or sand, which are not as abrasive as iron ore concentrate. If desired, the end portions of the said probes can be encased in an electrically conducting abrasion resistant sleeve of, for example, tungsten carbide, which is coated with an electrically insulating material on the downstream surfaces.

In the foregoing description and drawing, I have set forth my invention in the particular detailed form which I prefer to adopt.

I claim:
1. A probe adapted for measuring the electric characteristics of a bed of flowing moist granular material comprising:
   (a) an elongated solid metallic electrode having a body portion and an end portion,
   (b) an electrically insulating abrasion resistant sleeve encasing the body portion of the electrode,
   (c) an electrically conducting abrasion resistant sleeve encasing the end portion of the electrode,
   (d) an electrically insulating material on the sleeve (c) extending the entire length thereof and covering a substantially uninterrupted portion less than one-half of the perimeter and on the downstream surface thereof, the remainder of the perimeter being free of such insulating material.
2. The probe of claim 1 in which:
   (e) the end portion of the electrode extends at an an angle to the body portion of the electrode, and
   (f) the electrically insulating material on the sleeve (c) is on that portion of the perimeter of the sleeve which forms with the body portion of the electrode the smaller included angle.
3. The probe of claim 1 in which the sleeve (c) is a metal carbide.
4. The probe of claim 1 in which the material of element (d) covers substantially 150° of the perimeter of the sleeve (c).
5. The probe of claim 2 in which the material of element (d) covers substantially 150° of the perimeter of the sleeve (c).

References Cited

UNITED STATES PATENTS

| | | | |
|---|---|---|---|
| 2,123,812 | 7/1938 | Stevens et al. | 324—61 |
| 2,378,440 | 6/1945 | Scott | 324—65 |
| 2,525,754 | 10/1950 | Albrecht | 324—30 |
| 2,772,394 | 11/1956 | Bradley | 324—61 |
| 2,939,070 | 5/1960 | Rosenthal | 324—30 |
| 3,141,129 | 7/1964 | Dietert | 324—65 |
| 3,243,365 | 3/1966 | Aikin | 204—290 |

FOREIGN PATENTS 832,182   4/1960   Great Britain.

RUDOLPH V. ROLINEC, *Primary Examiner.*
WALTER L. CARLSON, *Examiner.*
E. E. KAUBASIEWICZ, C. F. ROBERTS,
*Assistant Examiners.*